United States Patent
Landi, Jr.

(10) Patent No.: US 10,995,868 B2
(45) Date of Patent: May 4, 2021

(54) VALVE ASSEMBLY FOR INFLATABLE BLADDER AND METHOD OF MANUFACTURING THE SAME

(71) Applicant: NSI INTERNATIONAL, INC., New York, NY (US)

(72) Inventor: Frank J. Landi, Jr., New York, NY (US)

(73) Assignee: NSI INTERNATIONAL, INC., New York, NY (US)

( * ) Notice: Subject to any disclaimer, the term of this patent is extended or adjusted under 35 U.S.C. 154(b) by 70 days.

(21) Appl. No.: 16/525,906

(22) Filed: Jul. 30, 2019

(65) Prior Publication Data

US 2019/0353262 A1     Nov. 21, 2019

Related U.S. Application Data

(62) Division of application No. 14/416,089, filed as application No. PCT/US2014/017819 on Feb. 21, 2014, now Pat. No. 10,408,359.

(Continued)

(51) Int. Cl.
*F16K 15/20* (2006.01)
*A63B 41/04* (2006.01)
*B29C 49/42* (2006.01)

(52) U.S. Cl.
CPC ............ *F16K 15/202* (2013.01); *A63B 41/04* (2013.01); *B29C 49/4252* (2013.01);
(Continued)

(58) Field of Classification Search
CPC ... B29C 49/4252; F16K 15/20; F16K 15/202; F16K 15/147; Y10T 137/3584–3786;
(Continued)

(56) References Cited

U.S. PATENT DOCUMENTS

| 1,515,645 A | ‡ | 11/1924 | Yablick | F16K 15/147 |
| | | | | 137/848 |
| 1,596,320 A | ‡ | 8/1926 | Sonnett | F16K 15/202 |
| | | | | 137/223 |

(Continued)

FOREIGN PATENT DOCUMENTS

| CA | 2411265 A1 | ‡ | 12/2001 | A63B 41/00 |
| FR | 688098 A | ‡ | 8/1930 | F16K 15/147 |

(Continued)

OTHER PUBLICATIONS

PCT/US2014/017819 Search Report and Written Opinion, dated May 20, 2014, 12 pages—English.

(Continued)

*Primary Examiner* — Craig J Price
(74) *Attorney, Agent, or Firm* — Andrew F. Young, Esq.; Nolte Lackenbach Siegel

(57) ABSTRACT

The present invention relates to inflatable bodies or systems with bounding walls or bladder structures and at least one valve assembly thermally bonded thereto. More particularly, the present invention provides a valve assembly for inflatable bodies typically made from a thermoplastic rubber material or the like, which will exhibit significantly increased strength and durability during inflation and while inflated, especially at and around the interface between the air valve assembly and the bounding wall of the inflatable body because of the enhanced strength of the interface through thermal sealing.

4 Claims, 7 Drawing Sheets

Related U.S. Application Data

(60) Provisional application No. 61/768,280, filed on Feb. 22, 2013.

(52) U.S. Cl.
CPC .......... *F16K 15/20* (2013.01); *Y10T 137/0486* (2015.04); *Y10T 137/3584* (2015.04)

(58) Field of Classification Search
CPC .......... Y10T 137/7882; Y10T 137/7883; Y10T 137/7891; Y10T 137/374; Y10T 137/3631; Y10T 137/8376; Y10T 137/7884; Y10T 137/0486; B63C 2011/182; Y10S 152/07; Y10S 137/903; A62B 9/00; A62B 18/10; A63B 41/04; A63B 41/12
USPC .................. 137/223–234.5, 846, 847, 15.17; 473/610, 611; 285/41
See application file for complete search history.

(56) References Cited

U.S. PATENT DOCUMENTS

| | | | | | |
|---|---|---|---|---|---|
| 1,613,677 | A | * | 1/1927 | Riddell | A63B 41/085 |
| | | | | | 473/603 |
| 1,630,040 | A | ‡ | 5/1927 | Vogt | F16K 15/202 |
| | | | | | 137/223 |
| 1,672,905 | A | * | 6/1928 | Riddell | F16K 15/202 |
| | | | | | 473/611 |
| 1,680,757 | A | ‡ | 8/1928 | Yablick | A62B 18/10 |
| | | | | | 137/560 |
| 1,951,565 | A | ‡ | 3/1934 | Sonnett | F16K 15/202 |
| | | | | | 137/223 |
| 1,990,374 | A | ‡ | 2/1935 | Goldsmith | F16K 15/202 |
| | | | | | 137/223 |
| 1,994,790 | A | ‡ | 3/1935 | Roedding | F16K 15/202 |
| | | | | | 152/415 |
| 1,997,955 | A | * | 4/1935 | Weaver | F16K 15/202 |
| | | | | | 473/610 |
| 2,062,248 | A | * | 11/1936 | Heck | B29C 66/71 |
| | | | | | 156/147 |
| 2,080,894 | A | * | 5/1937 | Levinson | A63B 41/04 |
| | | | | | 473/603 |
| 2,085,369 | A | ‡ | 6/1937 | Kilborn | F16K 15/20 |
| | | | | | 137/223 |
| 2,134,634 | A | ‡ | 10/1938 | Goldsmith | F16K 15/202 |
| | | | | | 473/611 |
| 2,151,466 | A | ‡ | 3/1939 | Eken | F16K 15/202 |
| | | | | | 137/223 |
| 2,183,900 | A | * | 12/1939 | Voit | A63B 41/04 |
| | | | | | 137/223 |
| 2,300,441 | A | * | 11/1942 | Voit | B29D 22/04 |
| | | | | | 264/512 |
| 2,671,633 | A | ‡ | 3/1954 | Corson | F16K 15/202 |
| | | | | | 137/223 |
| 2,934,344 | A | ‡ | 4/1960 | Chupa | F16K 15/202 |
| | | | | | 137/223 |
| 3,042,941 | A | ‡ | 7/1962 | Marcus | A47C 27/18 |
| | | | | | 5/708 |
| 3,100,641 | A | ‡ | 8/1963 | *Nicholls | B29C 41/20 |
| | | | | | 137/223 |
| 3,118,672 | A | ‡ | 1/1964 | *Dorn | F16K 15/202 |
| | | | | | 137/223 |
| 3,217,733 | A | ‡ | 11/1965 | *Irma | B60C 29/007 |
| | | | | | 137/226 |
| 3,240,228 | A | ‡ | 3/1966 | Weis | E03C 1/104 |
| | | | | | 137/858 |
| 3,410,299 | A | ‡ | 11/1968 | Whittington | F16K 15/202 |
| | | | | | 137/223 |
| 3,761,959 | A | ‡ | 10/1973 | Dunning | A42B 3/122 |
| | | | | | 137/223 |
| 3,802,981 | A | * | 4/1974 | Oldshue | B60C 5/04 |
| | | | | | 156/120 |
| 3,905,387 | A | ‡ | 9/1975 | Grant | F16K 15/202 |
| | | | | | 137/22 |
| 3,964,509 | A | ‡ | 6/1976 | Daubenberger | F16K 15/147 |
| | | | | | 137/844 |
| 4,178,643 | A | ‡ | 12/1979 | Cox, Jr. | A61F 2/12 |
| | | | | | 137/84 |
| 4,263,682 | A | ‡ | 4/1981 | Bejarano | A61F 2/12 |
| | | | | | 623/8 |
| 4,274,633 | A | ‡ | 6/1981 | Benscher | A63B 41/04 |
| | | | | | 473/610 |
| 4,413,645 | A | * | 11/1983 | Seabase | F16K 15/20 |
| | | | | | 137/223 |
| 4,513,058 | A | * | 4/1985 | Martin | C08J 7/0427 |
| | | | | | 428/336 |
| 4,568,081 | A | * | 2/1986 | Martin | F16K 15/202 |
| | | | | | 473/611 |
| 5,026,339 | A | * | 6/1991 | Kasper | B29C 66/73921 |
| | | | | | 493/189 |
| 5,082,244 | A | ‡ | 1/1992 | Krier | F16L 37/40 |
| | | | | | 251/149.6 |
| 5,294,112 | A | * | 3/1994 | Smith | A63B 41/02 |
| | | | | | 473/610 |
| 5,358,001 | A | ‡ | 10/1994 | Smith | F16K 15/202 |
| | | | | | 137/223 |
| 5,370,150 | A | ‡ | 12/1994 | Nehm | B29C 45/14344 |
| | | | | | 137/454.2 |
| 5,606,995 | A | ‡ | 3/1997 | Raftis | F16K 15/147 |
| | | | | | 137/846 |
| 5,727,593 | A | ‡ | 3/1998 | Duer | E03F 7/04 |
| | | | | | 137/846 |
| 5,915,407 | A | ‡ | 6/1999 | West | F16K 15/202 |
| | | | | | 137/22 |
| 6,719,004 | B2 | ‡ | 4/2004 | Huber | E03F 5/0407 |
| | | | | | 137/362 |
| 7,546,696 | B1 | ‡ | 6/2009 | Acheson | A43B 13/203 |
| | | | | | 36/29 |
| 8,292,764 | B2 | ‡ | 10/2012 | Steidle | A63B 41/085 |
| | | | | | 473/610 |
| 8,672,784 | B2 | * | 3/2014 | Berggren | A63B 41/04 |
| | | | | | 473/610 |
| 9,435,453 | B1 | ‡ | 9/2016 | Shen | F16K 15/147 |
| 9,567,737 | B2 | ‡ | 2/2017 | McAlpine | E03C 1/298 |
| 9,897,227 | B2 | ‡ | 2/2018 | McAuliffe | F16K 31/1266 |
| 2009/0325744 | A1 | * | 12/2009 | Raynak | A63B 45/00 |
| | | | | | 473/604 |
| 2009/0325745 | A1 | * | 12/2009 | Rapaport | A63B 41/04 |
| | | | | | 473/604 |
| 2012/0160339 | A1 | ‡ | 6/2012 | Merino Lopez | B29D 30/0685 |
| | | | | | 137/223 |
| 2015/0192212 | A1 | ‡ | 7/2015 | Landi, Jr. | B29C 49/4252 |
| | | | | | 137/22 |
| 2018/0142795 | A1 | * | 5/2018 | Landi | B60C 29/04 |

FOREIGN PATENT DOCUMENTS

FR 2756899 A1 ‡ 6/1998 .......... B05B 11/007
JP 2010-155071 ‡ 7/2010

OTHER PUBLICATIONS

U.S. Appl. No. 15/589,132, Office Action dated Sep. 25, 2018.
U.S. Appl. No. 15/589,132, Office Action dated Feb. 2, 2019.

\* cited by examiner
‡ imported from a related application

VALVE ASSEMBLY FOR INFLATABLE BLADDER AND METHOD OF MANUFACTURING THE SAME

CROSS REFERENCE TO RELATED APPLICATIONS

This application relates to, and claims priority as a divisional application from, U.S. Ser. No. 14/416,089 filed Jan. 21, 2015, the entire contents of which are incorporated herein by reference, which in turn claims priority from SN. PCT/US2014/017819 filed Feb. 21, 2014, the entire contents of which are incorporated herein by reference, which in turn claims priority to U.S. Prov. Ser. No. 61/768,280 filed Feb. 22, 2013.

FIGURE SELECTED FOR PUBLICATION

FIG. 9.

BACKGROUND OF THE INVENTION

Field of the Invention

The present invention relates to inflatable bodies or systems with bounding walls or bladder structures and at least one valve assembly. More particularly, the present invention provides a valve assembly for inflatable bodies typically made from thermoplastic rubber material and the like which will exhibit significantly increased strength and durability during inflation and while inflated especially at and around the interface between the air valve assembly and the bounding wall of the inflatable body.

Description of the Related Art

The prior art is directed to methods and apparatus for flexible air valves for use in inflatable bodies including, for example, balloons, sports balls, toys, exercise balls or equipment, inflatable boats, inflatable castles or other structures, and the like. Such inflatable products are typically fashioned from flexible polymer materials. As the strength of flexible polymer materials has improved over the years, inflatable product sizes have also increased. Inflatable items having small diameters have grown to large diameter inflatable structures or bodies.

The insertion of air into the inflatable body is typically accomplished by the use of a manual or electric air pump. The air pressure generated by the air pump is delivered to the inflatable body via an air hose. The air pump hose typically has a diameter larger than the inside diameter dimension of the opening of the air valve fitted in the inflatable body. In order to interface the hose from the air pump to the inflation air valve, a needle or other adapter or reducer is typically employed. Such a needle or other adapter or reducer is normally fitted on the end of the air hose and used for all inflatable bodies. The needle/adapter enables a standard size air hose extending from the air pump to be force-fitted into the air valve for filling the inflatable body with air.

However, the effectiveness of the air pump in delivering air to the inflatable body is controlled by the inside diameter dimension of the opening of the air valve fitted within the inflatable body. Generally, the larger the inside diameter dimension of the inflation air valve, the greater the effectiveness of the pump in inflating the body. Unfortunately, the inside diameter dimension of the air valves known in the prior art is small. While an air valve having a larger diameter and a greater cross-sectional area would result in increased effectiveness of the inflation air pump, several reasons exist for the absence of inflation air valves having a larger diameter and a greater cross-sectional area.

Various kinds of typical air valve and air valve assemblies have been developed for inflating air bladders, balloons, sports balls, or the like, and generally comprise a plug made of compressible material and having a needle passageway arranged for allowing a needle to pass through it and to expand towards itself to completely close when the needle is removed from the plug, and to ensure that pressurized air within the bladder cannot escape through the air valve.

For example, one such air valve is disclosed for use in a sportsball such as a soccer ball or volleyball to provide good air retention and durability. Such a valve, however, is preferably permanently sealed to the particular bladder, and is formed from a thermoplastic polyurethane elastomer similar to that used in the inner core. The air valve has a cylindrical-shaped body with a sealing flange, an air passage neck and a snap-in retaining flange. The body of the valve has a chamber within its central area in which a rubber pellet is placed to seal the interior of the bladder from the atmosphere and prevent the air used for inflation of the ball from escaping. The polyurethane valve is preferred due to the fact it will permanently bond with the wall of the inner core to ensure its full retention without an air leaking problem. Optimum bonding results from an inner core and an air valve made of the same thermoplastic material. However, the plug which is made of compressible material may fail after use. In addition, the air valve has no protective structure to absorb a force from the inflating needle.

Another known air valve for use in an inflatable bladder guards against accidental puncturing of the bladder by an inflating needle. The air valve includes a main body member with a core which has a neck at one end and an inflating needle passageway with a chamber extending through it. The air valve also includes an air sealing plug for positioning in the chamber and a protective bonnet positioned on a second end of the main body member. The main body member has an annular sealing flange extending radially from the first end and a snap-in retaining flange extending radially from the neck such that a bladder and an outer casing are trapped between the two flanges in a sealing relationship. The protective bonnet has at least one air escape opening to allow pressurized air from the inflating needle to pass into the bladder. In other words, the air valve has a protective bonnet permanently positioned within the bladder or the sports ball, and made of a rigid or semi-rigid plastic material to absorb the force from the inflating needle. However, the protective bonnet is spaced away from the needle passageway of the plug, and may not be used to block the needle passageway of the plug when the plug has become failure after use.

Bladders or bounding walls of inflatable bodies are conventionally made of rubber, latex, nylon, vinyl, polychloroprene, synthetic fabric, synthetic rubber, natural rubber, and the like. Other flexible materials for use in inflatable bodies include thermoplastic elastomers (TPE), otherwise known as thermoplastic rubbers (TPR), which are a class of copolymers or a physical mix of polymers (usually a plastic and a rubber) consisting of materials with both thermoplastic and elastomeric properties. While most elastomers are thermosets, thermoplastics are in contrast relatively easy to use in manufacturing, for example, by injection molding. Thermoplastic elastomers show advantages typical of both rubbery materials and plastic materials. The principal difference between thermoset elastomers and thermoplastic elastomers is the type of crosslinking bond in their structures. In fact, crosslinking is a critical structural factor which contributes to impart high elastic properties. The crosslink in thermoset polymers is a covalent bond created during the vulcanization process. On the other hand, the crosslink in thermoplastic elastomer polymers is a weaker dipole or hydrogen bond or takes place in one of the phases of the material.

There are six generic classes of commercial TPEs/TPRs: Styrenic block copolymers; Polyolefin blends; Elastomeric alloys (TPE-v or TPV); Thermoplastic polyurethanes; Thermoplastic copolyester; and Thermoplastic polyamides. Examples of TPE/TPR products that come from block copolymers group are Arnitel (DSM), Engage (Dow Chemical), Hytrel (Du Pont), Dryflex and Mediprene (ELASTO), Kraton (Shell chemical division), and Dynalloy (Polyone Corporation). In order to qualify as a thermoplastic elastomer, a material must have the following three essential characteristics: (i) demonstrate the ability to be stretched to moderate elongations and, upon the removal of stress, return to something close to its original shape; (ii) be processable as a melt at elevated temperature; and (iii) exhibit the absence of significant creep. Some of the properties of TPE/TPR materials generally include: light weight; colorability; high tear strength; excellent abrasion resistance; excellent dimension stability; low temperature flexible; excellent weather resistance; performance like vulcanized rubber; reusable and recyclable; non-migratory; and excellent electrical properties.

Advantageously, TPE/TPR materials have the potential to be recyclable since they can be molded, extruded and reused like plastics, but they have typical elastic properties of rubbers which are not recyclable owing to their thermosetting characteristics. TPE/TPR materials also require little or no compounding, with no need to add reinforcing agents, stabilizers or cure systems. Therefore, batch-to-batch variations in weighting and metering components are absent, leading to improved consistency in both raw materials and fabricated articles. TPEs/TPRs can be easily colored by most types of dyes. In addition, TPEs/TPRs consume less energy and allow closer and more economical control of product quality during manufacture.

On the other hand, TPEs/TPRs, relative to conventional rubber or thermoset, require relatively more expensive raw materials, are generally unable to be loaded with low cost fillers, such as carbon black (therefore preventing TPEs from being used in automobile tires), have poor chemical and heat resistance, and have high compression set and low thermal stability. Also, TPEs/TPRs may soften or melt at elevated temperatures above which they lose their rubbery behaviour.

The two most important manufacturing methods with TPEs/TPRs are extrusion and injection molding. Compression molding is seldom, if ever, used. Fabrication via injection molding is extremely rapid and highly economical. Both the equipment and methods normally used for the extrusion or injection molding of a conventional thermoplastic are generally suitable for TPEs/TPRs. TPEs/TPRs can also be processed by blow molding, thermoforming, and heat welding.

TPEs/TPRs may be used where conventional elastomers cannot provide the range of physical properties needed in the product. These materials find large application in the automotive sector and in household appliances sector. Thus, co-polyester TPEs/TPRs are used in snowmobile tracks where stiffness and abrasion resistance is at a premium. They are also widely used for catheters where nylon block copolymers offer a range of softness ideal for patients. Thermoplastic silicon and olefin blends are used for extrusion of glass run and dynamic weatherstripping car profiles. Styrene block copolymers are used in shoe soles for their ease of processing, and widely as adhesives. TPEs/TPRs are commonly used to make suspension bushings for automotive performance applications because of its greater resistance to deformation when compared to regular rubber bushings. TPEs/TPRs may also be used in products meant for bodily insertion, and are also finding more and more use as electrical cable jacket/inner insulation.

Other applications of TPEs/TPRs include the footwear industry (for example, in the production of shoes soles, loafers sole, safety shoes sole & industrial shoes sole, sports shoes sole, ski-boot soles, kiddy shoes sole and related decorative accessories, unisole, modifier asphalt, modification modifier for SMC (sheet moulding compound) and other thermoset & thermoplastic composites), the automotive, sports and leisure industries (for example, in profiles, gaskets, lip-seals, tubings, pipes, co-extrusion automotive gasket, o-ring, bushings, bellows, floor mat, protecting covers, automotive grip, food & medical, ball pen grip, tooth brush grip, umbrella handle grip, milk tubing, disposable medical product, beverages), and the electrical and electronics industry (for example, in manufacturing welding cable, jacketing, flexible cord, primary wire, fire retardant control cable).

Synoprene Polymers Pvt. Ltd., one manufacturer of TPE/TPR materials, offers quality thermoplastic rubber, which is a part of Styrene Elastomer family that displays rubber like properties having styrenic based segment to achieve excellent strength. Besides conventional vulcanized rubber, it delivers superior properties to make replacement application of rubber and soft plastic in the sense of processing and end uses. Our compounding ability makes TPR as a homogeneous composition to achieve excellent quality and processability. This Synoprene® TPR is based on styrenic as hard segment & soft phase consists of rubbery butadiene center and crystalline styrene at ends. It can combine well with many other elastomers, extenders, modifiers and other resins. All these combinations can be controlled to vary properties such as tack stiffness, softening temperatures and cohesive strengths according to the needs of specific and general usage. It is being widely accepted due to its various range in cost effective and value engineered concepts.

The present invention recognizes the need for an improved air valve assembly for highly durable inflatable bodies typically made from TPE/TPR material and the like which will exhibit significantly increased strength and durability during and after inflation, especially at and around the interface between the air valve assembly and the bounding wall of the inflatable body. The present invention has arisen to mitigate and/or obviate the aforementioned disadvantages of the conventional air valves.

SUMMARY OF THE INVENTION

The primary objective of the present invention is to provide an improved air valve assembly for inflatable bodies typically made from thermoplastic rubber material and the like which will exhibit significantly increased strength and durability during inflation and while inflated, especially at and around the interface between the air valve assembly and the bounding wall of the inflatable body.

In accordance with one aspect of the invention, there is provided an air valve assembly for attachment to an inflatable thermoplastic rubber bladder or bounding wall structure, the air valve assembly comprising a valve member having a flange extending radially therefrom, the valve member including a bore formed therein and a slot valve extending therefrom with a central opening communicating with the bore of the valve member. The opening of the slot valve has an inner diameter such that air may not flow in a reverse direction therethrough. The valve member further comprises an integrally bonded o-ring around the bore of the valve member, the o-ring providing added strength and durability during and after inflation of the inflatable bladder or bounding wall. The valve member including a peripheral sealing flange extended radially therefrom for attaching to the bladder or bounding wall.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the various following drawings in which.

DETAILED DESCRIPTION OF THE PREFERRED EMBODIMENTS

Figure 1:
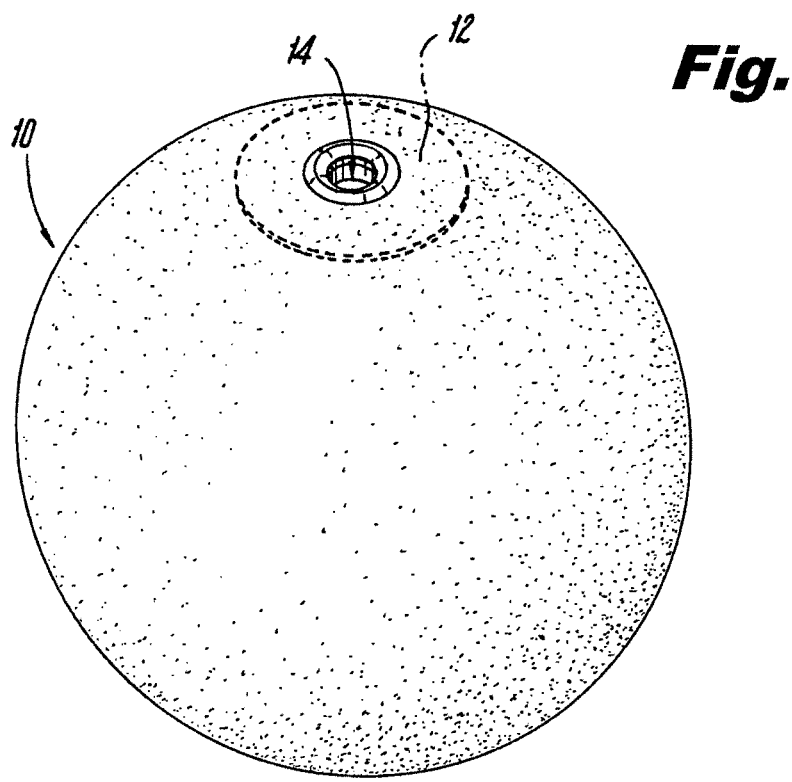
FIG. 1 shows a top perspective view of one alternative air valve assembly integrated with an inflatable bladder member in accordance with a first embodiment of the invention.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

Figure 2:
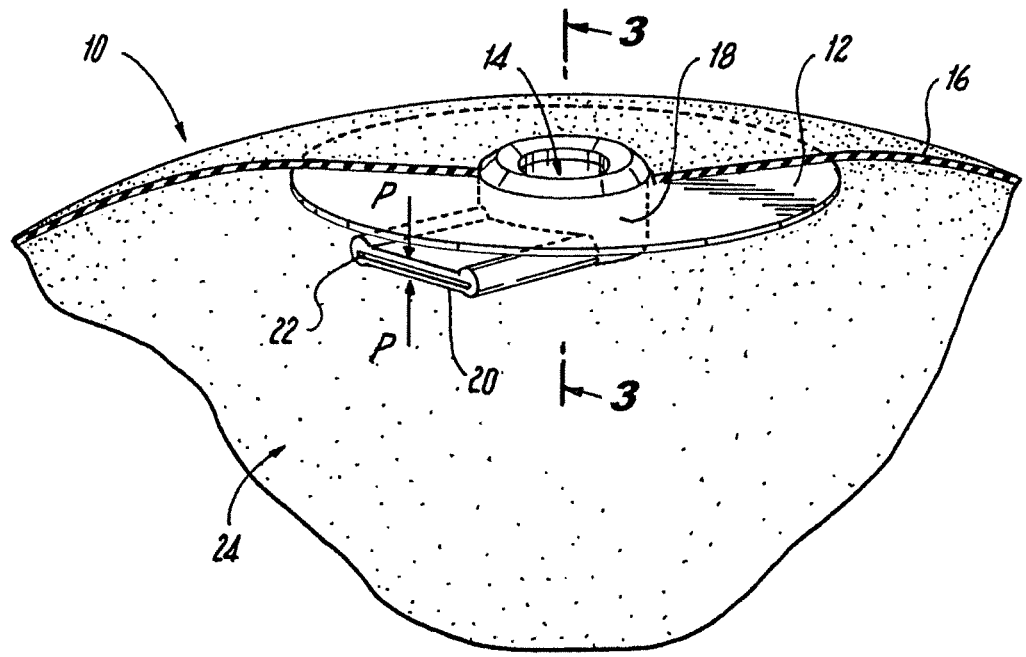
FIG. 2 shows a partial top cutaway perspective plan view of a portion the inflatable bladder shown in FIG. 1 showing the slot valve of the air valve assembly according to the first embodiment of the invention.

Referring first to FIGS. 1-2, respectively, shown are a top perspective view of a air valve assembly 14 integrated with an inflatable bladder 10 having an inner surface 24, and a partial top cutaway perspective plan view of a portion the volume or inflatable bladder 10 shown in FIG. 1 showing the slot valve 20 of the air valve assembly 14 according to a preferred embodiment of the invention. As will be described in more detail below, the present invention provides a valve assembly 14 for inflatable bodies 10 typically made from thermoplastic rubber material and the like which will exhibit significantly increased strength and durability during inflation and while inflated, especially at and around the interface between the air valve assembly 14 and the bounding wall 16 of the inflatable body 10. The air valve assembly 14 in accordance with the present invention comprises a valve body or air valve member 18 including a peripheral sealing flange 12 extended radially therefrom, such as the upper end thereof, for attaching to the inner or outer portion of bladder or bounding wall 16 of an inflatable body 10.

The bounding wall or bladder 16 of the inflatable body 10 may be made from thermoplastic polyurethane elastomer (TPE) materials or substantially formed from thermoplastic rubber (TPR) materials, such as polyester-based or polyether-based polyurethane, polyvinyls, polyesters and polyethers, etc., which contribute a desired property, e.g. air retention, abrasion resistance, etc. Kraton is one such preferred material for use as the bladder or bounding wall 16 of the inflatable body in accordance with the present invention. Other high-expansion materials may be employed without departing from the scope and spirit of the present invention. These materials may be mixed with colorants or fillers to adjust color (e.g., to make a big character figure (Sponge Bob®) or colored like a 'Super-Man' cape) also without departing from the scope and spirit of the present invention.

Figure 3:
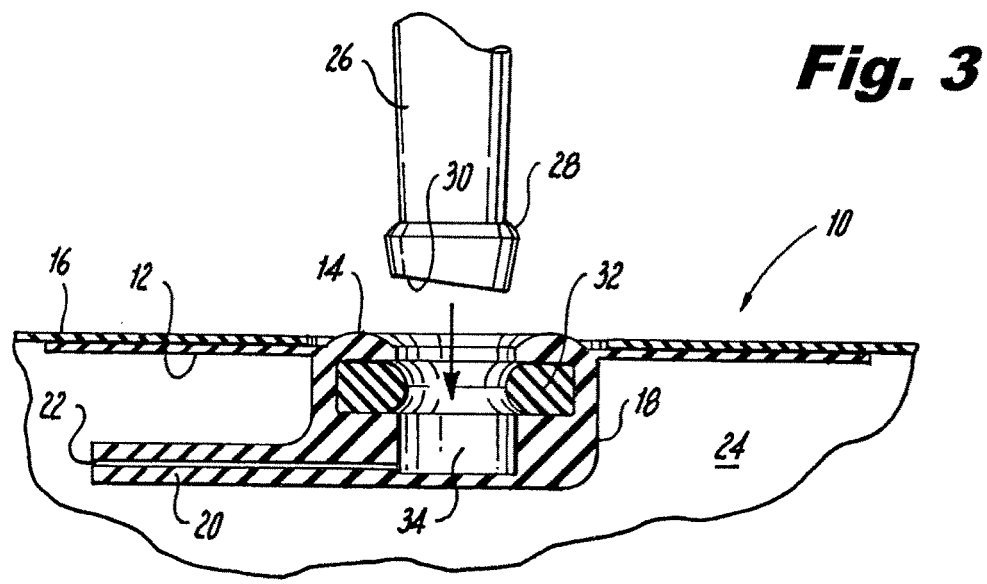
FIG. 3 shows a cross sectional view of the valve assembly of the invention taken at line 3-3 of FIG. 2, illustrating the inner details of the air valve assembly according to the first embodiment of the invention, and further illustrating the insertion of a pump needle for inflation of the inflatable bladder.
Figure 4:
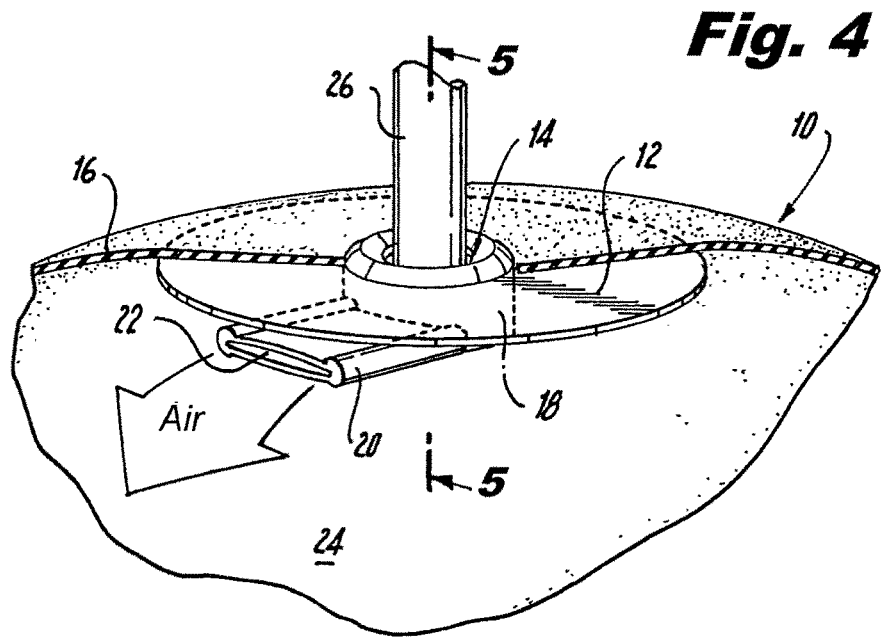
FIG. 4 shows a partial top cutaway perspective plan view of a portion the inflatable bladder shown in FIG. 1 showing the slot valve of the air valve assembly according to the first embodiment of the invention, further illustrating the insertion of a pump needle and the flow of air through the slot valve of the air valve assembly into the inflatable bladder.
Figure 5:
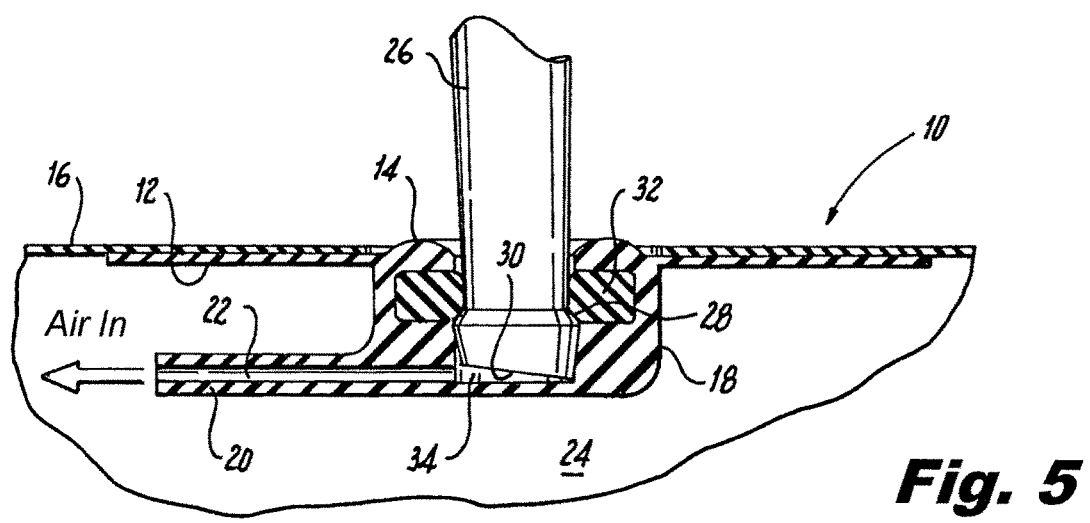
FIG. 5 shows a cross sectional view of the valve assembly of the invention taken at line 5-5 of FIG. 4, illustrating the inner details of the air valve assembly according to the first embodiment of the invention with the pump needle inserted into the air valve assembly for inflation of the inflatable bladder.

As shown in FIGS. 3-5, shown is the valve member 18 of the invention illustrating the inner details of the air valve member 18 according to a preferred embodiment of the invention, and further illustrating the insertion of a pump needle 26 for inflation of the inflatable bladder or bounding wall 16. As shown, the air valve member 18 includes a central bore 34 formed therein. The valve member 18 also includes a slot valve 20 extending therefrom with a central opening 22 communicating with the bore 34 of the valve member 18. The opening 22 of the slot valve 20 has an inner diameter such that air may not flow in a reverse direction therethrough (i.e., the internal air pressure effectively closes the slot valve opening 20 (by pressing the opposing sides of the slot valve together, see arrows P-P in FIG. 2) when air is not being forced through it into the inflatable body 10. The valve member 18 further comprises an integrally bonded (or co-bonded) o-ring 32 around the bore 34 of the valve member 18. The o-ring 32 provides added strength and durability to the valve member 18 during and after inflation of the inflatable bladder or bounding wall 16. Optimally, such improvement is on the order of 1000-8000 times on the stress strength and/or durability of the valve/bounding wall interface. As this causes substantial volumetric expansion stress at the valve site (which itself cannot expand) selection of proper materials is essential to suitable function.

It is preferable that the valve member 18 and the o-ring 32 be of the same TPR material as well as the bounding wall or bladder 16, but that the o-ring 32 be of a higher density than the material of the valve member 18. Providing such integrally bonded or co-banded, higher density o-ring 32 within valve member 18 will provide the added strength and durability to the valve/bounding wall interface. Thus, important features include: a higher density o-ring 32, co-bonding of the o-ring 32 with valve member 18, and use of the same material for o-ring 32 and bounding wall 16. Also, it is preferred that angled tip be used on valve or pump coupling 26 to assist in making sure that consistent air flow is possible during filling. Further, a bulge 28 on the filler neck of valve or pump coupling 26 "pops" past insert molded o-ring 32 in the valve member 18, as seen in FIG. 5, to securely seat valve or pump coupling 26 into valve member 18 for inflation of the inflatable body 10. As can be seen in FIG. 4, during inflation, central opening 22 of slot valve 20 expands to allow greater flow of air into the interior of bounding wall or bladder 16 of inflatable body 10. Once inflation stops, the internal air pressure is great enough to hold central opening 22 of slot valve 20 closed such that air may not escape from the inflated body 10.

In operation, the valve or pump coupling 26 is engageable through the central bore 34 of the valve member 14 for inflating the bladder 16. After the bladder 16 has been inflated and when the valve or pump coupling 26 has been disengaged from the central bore 34, the pressurized air in the bladder 16 may force the central opening 22 of the slot valve 20 to close and thus to block passage of any air from inside bladder 16 to the exterior. Accordingly, the air valve member 18 in accordance with the present invention includes a structure, or slot valve 20, configured such that the air passage will be substantially, if not completely, blocked upon removal of the needle or pump valve 26 from the air valve member 18, and to ensure that pressurized air within the bladder or bounding wall 16 cannot escape through the air valve member 18. In other words, slot valve 20 functions as a one-way valve. Preferably, valve member 18 is formed using injection molding, although other known techniques may be employed.

Figure 6:
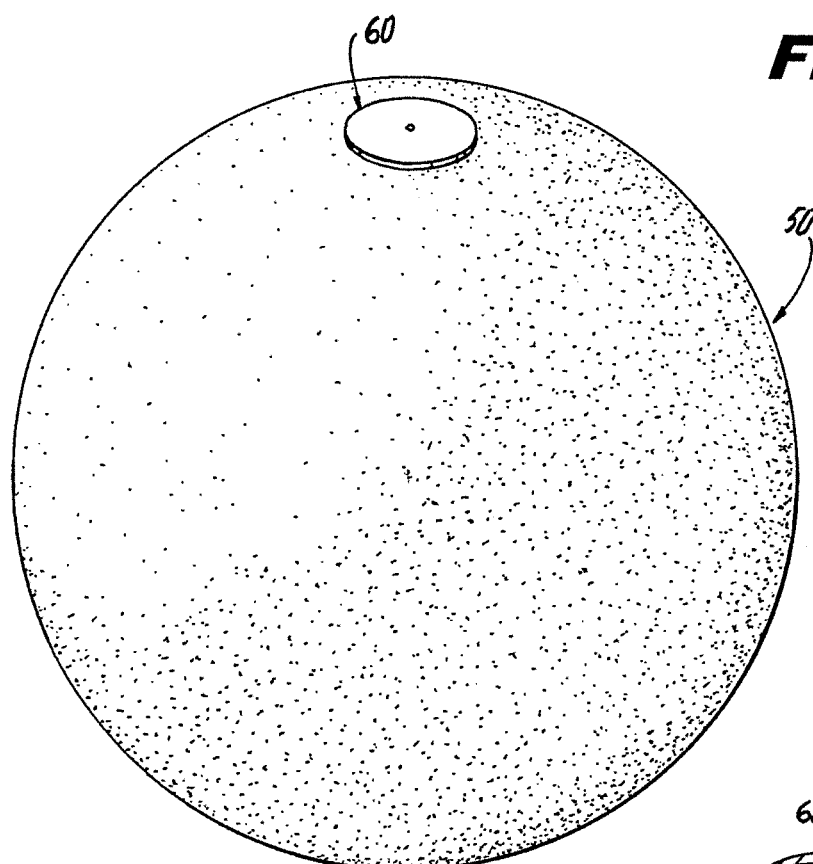
FIG. 6 shows a top perspective view of a further alternative air valve assembly integrated with an inflatable bladder member in accordance with an alternative second embodiment of the invention.
Figure 7:
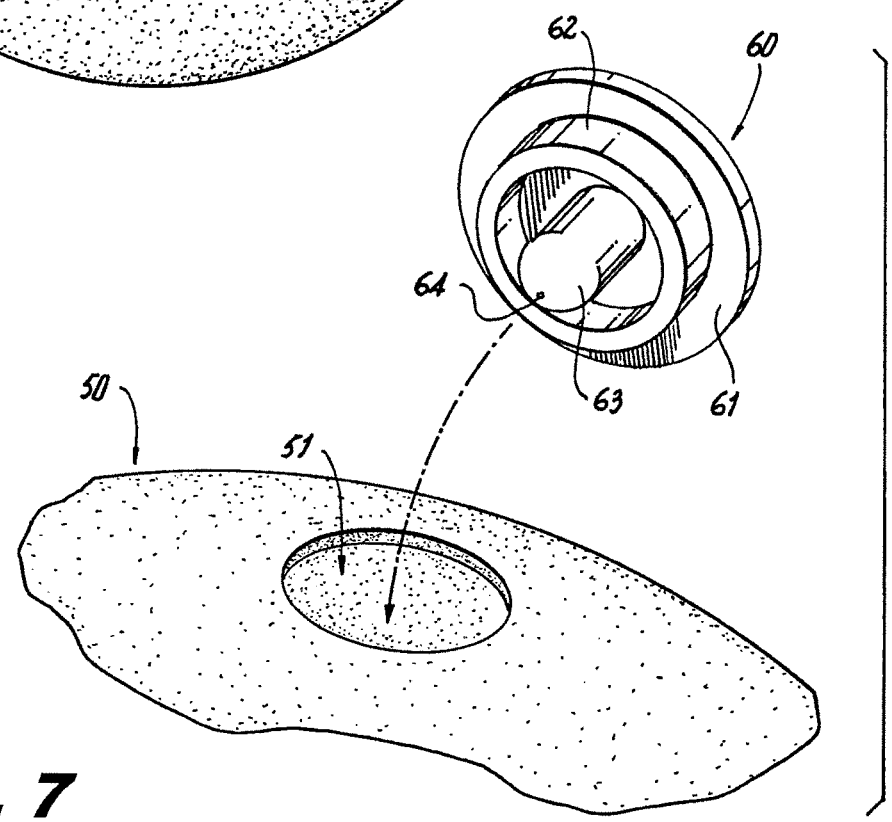
FIG. 7 shows a partially exploded top perspective view of the air valve assembly and inflatable bladder member in accordance with the second embodiment of the invention.
Figure 8:
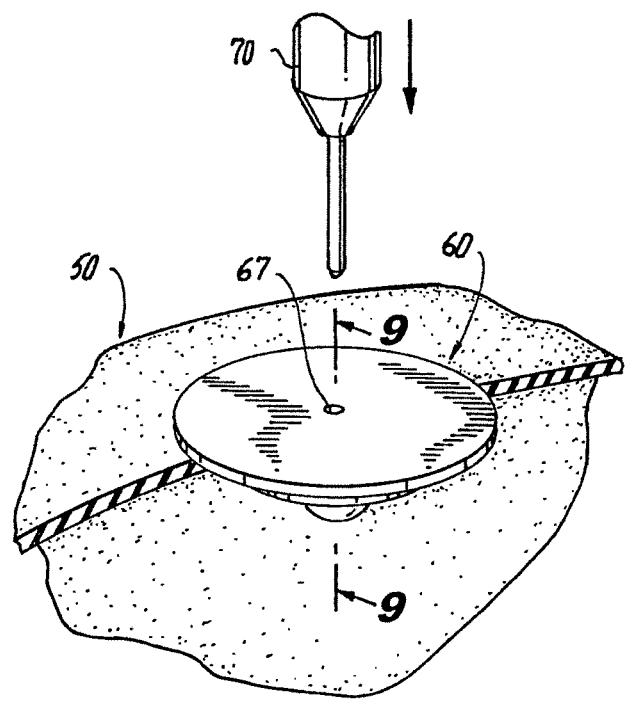
FIG. 8 shows a partial top cutaway perspective view of a portion the inflatable bladder shown in FIGS. 6-7 showing the opening of the air valve assembly according to the invention, further illustrating the direction of insertion of a pump needle or inflator into the air valve assembly.

Referring next to FIGS. 6-9A, shown is a top perspective view of an alternative air valve assembly integrated 60 with an inflatable bladder member in accordance with a second alternative embodiment of the invention. As seen in FIG. 6, the valve 60 according to a preferred embodiment of the invention is for use with an inflatable bladder or volume 50. In this embodiment, valve 60 preferably has a generally circular configuration for insertion into a correspondingly circular opening 51 in the inflatable bladder or volume 50. As discuss herein, valve 60 is preferably thermally sealed within opening 51 in the volume or inflatable bladder 50. Valve 60 is preferably configured with a generally flat outer surface with a valve entry hole 67 positioned in the central region thereof for receiving an end of an inflator 70. On an inner side of the valve 60 there is preferably a generally cylindrical valve member 63 projecting therefrom having an outer surface which is substantially smooth. Optionally, the valve 60 also comprises a lip or rim 62 spaced apart from and circling the valve member 63. Lip or rim or ring member 62 may provide added support to the interface between the valve 60 and the volume 50 during and/or after inflation of the volume 50.

Figure 9:
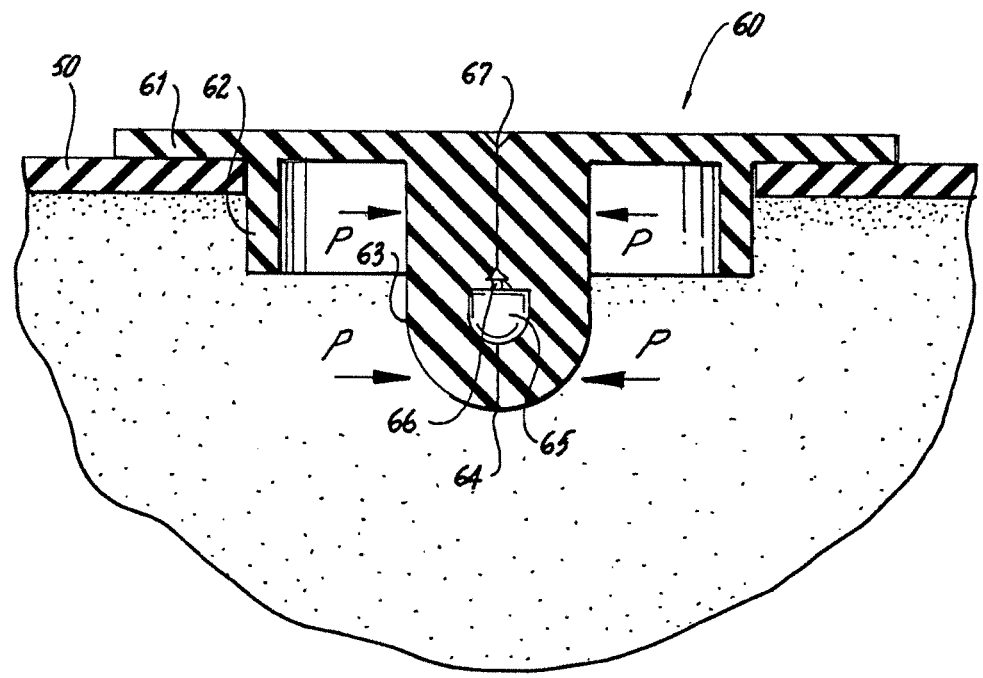
FIG. 9 shows a cross sectional view of the valve assembly of the invention taken at line 9-9 of FIG. 8, illustrating the inner details of the air valve assembly according to the second embodiment of the invention.
Figure 9A:
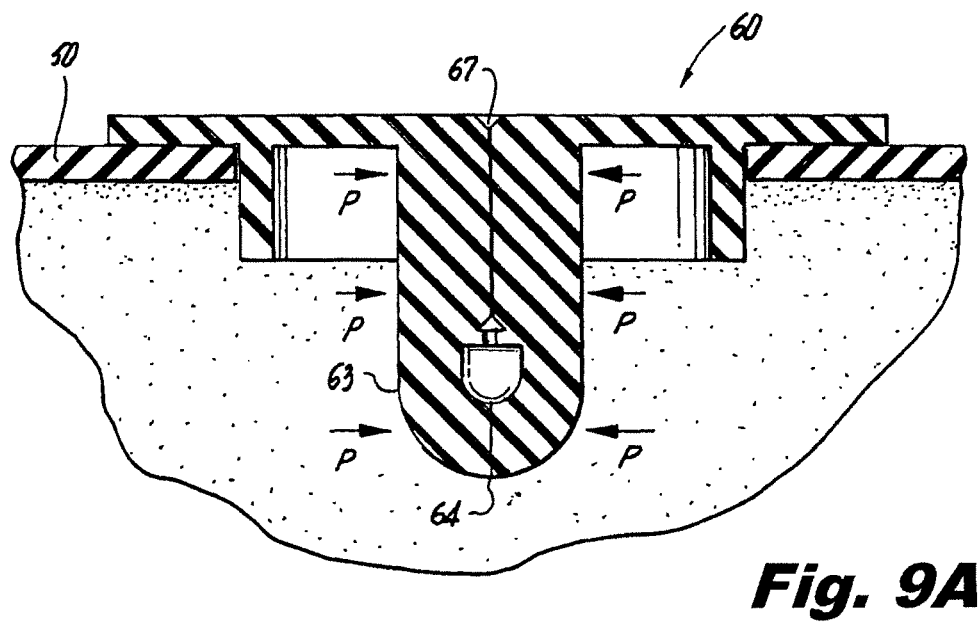
FIG. 9A shows a cross sectional view of the valve assembly of the invention taken at line 9-9 of FIG. 8, illustrating the inner details of an alternative embodiment of the air valve assembly according to the second embodiment of the invention.
Figure 10A:
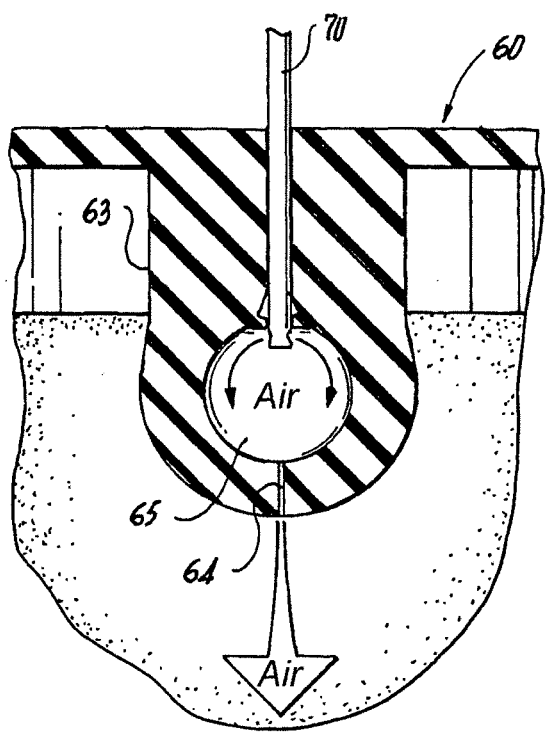
FIG. 10A shows a partial cross sectional view of the valve assembly of FIGS. 9-9A, showing the valve of the air valve assembly according to the second embodiment of the invention, further illustrating the insertion of a pump needle or inflator and the beginning of the flow of air from the inflator into an inner region of the valve assembly and into the inflatable bladder.
Figure 10B:
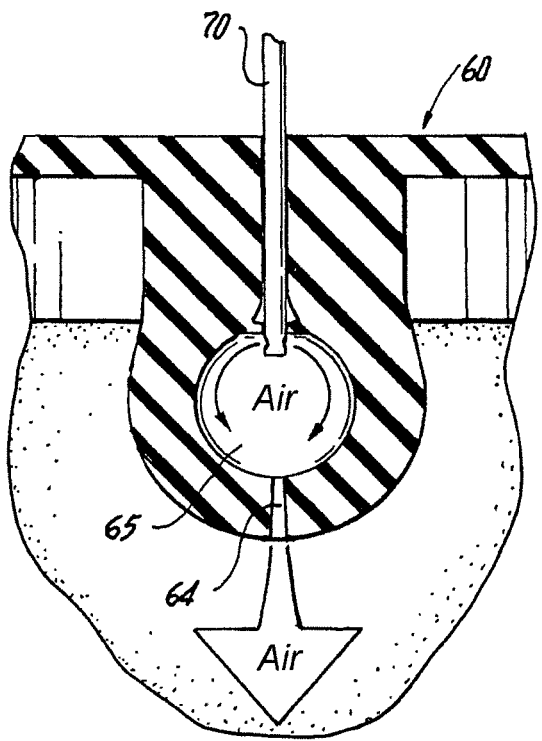
FIG. 10B shows a partial cross sectional view of the valve assembly of FIGS. 9-9A, showing the valve of the air valve assembly according to the second embodiment of the invention, further illustrating the flow of air from the inflator into an inner region of the valve assembly and through a second valve opening into the inflatable bladder.
Figure 10C:
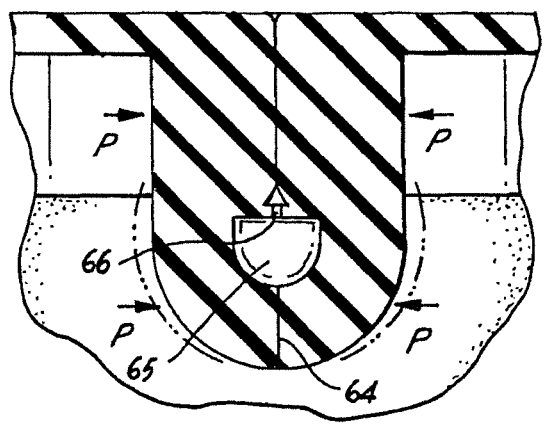
FIG. 10C shows a partial cross sectional view of the valve assembly of FIGS. 9-9A, showing the valve of the air valve assembly according to the second embodiment of the invention, further illustrating the resealing of the valve openings upon removal of the pump needle or inflator after the inflation of the inflatable bladder.

As more clearly seen in FIG. 9, when positioned within opening 51 of the volume 50, the thermal sealing of valve 60 to the volume 50 provides an expandable airtight seal therebetween. When inflatable body 50 is inflated, a pressure P acts as a force keeping valve entry hole 67 through opening 64 in a closed, airtight sealed manner so that no or minimal air may exit from the inflated body 50. In one embodiment, as shown in FIGS. 9-9A and 10A-10C, during inflation, the needle or head of the inflator 70 is extended into valve member 63 until it reaches the inner valve volume 65. As air is pumped from inflator 70 inner valve volume 65 expands so as to concurrently open the opening 64 at the lower end of the valve member 63. The sidewalls of the valve member 63 bulge outward to allow for opening 64 to expand and permit the passage of air into the volume of inflatable body 50. In a first embodiment of valve 60, as shown in FIG. 9, the valve member 63 may have a radius in the range of 4-6 millimeters (mm) and a length from valve inner partial seal 66 to the valve's inner opening 64 also in the range of 4-6 mm. In a second embodiment of valve 60, as seen in FIG. 9A, the valve member 63 may again have a radius in the range of 4-6 mm and a length from valve inner partial seal 66 to the valve's inner opening 64 also in the range of 4-6 mm, but have an extended length from the valve entry hole 67 to the valve inner partial seal 66. As air is pumped harder or more forcefully, opening 64 is expanded similarly to allow the passage of a greater volume of air, as seen in FIG. 10B. Once volume 50 is filled with the desired amount of air, needle or head of inflator 70 is removed from the valve entry hole 67 of the valve 60. Once removed, the pressure P of the air from within the volume 50 acts urgingly upon the sidewalls of the valve member 63 to urge close the passage from entry hole 67 to the inner volume 65 as well as close the opening 64 with an airtight seal. Preferably, valve 60 is configured such that the opening from valve entry hole 67 through valve inner partial seal 66 to inner valve volume 65 and through opening 64 into the inner region of the volume 50 is maintained with airtight seal following inflation.

Figure 9B:
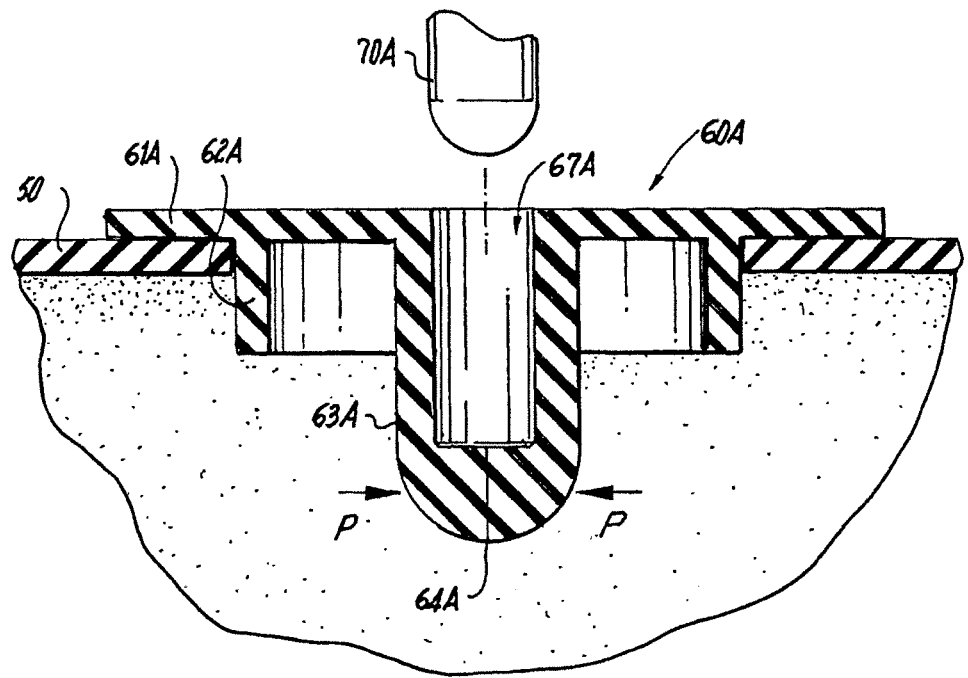
FIG. 9B shows a cross sectional view of the valve assembly of the invention taken at line 9-9 of FIG. 8, illustrating the inner details of a yet another alternative embodiment of the air valve assembly according to the second embodiment of the invention, and it will be recognized that alternative valve assembly shapes and constructions can exist without departing from the scope and spirit of the present invention.

In an alternative embodiment of valve 60, as shown in FIG. 9B, the valve member 63A may be configured such that the valve entry hole 67A has a substantially wider diameter than in the prior embodiments. Such a wider entry hole 67A allows for a wider head or needle from an inflator 70A (e.g., having a diameter in the range of 0.5-0.75 inches) to be used in order to force greater amounts of air into the inflatable body 50. As with the embodiments discussed above, during inflation, the needle or head of the inflator 70A is extended into valve member 63A until it reaches a bottom end of the entry hole 67A. As air is pumped from the inflator 70A the valve member 63A expands so as to open the opening 64A at the lower end of the valve member 63A. The sidewalls of the valve member 63A again bulge outward to allow for opening 64A to expand and permit the passage of air from the inflator 70A into the volume of inflatable body 50. In this embodiment of valve 60A, as shown in FIG. 9B, the valve member 63A preferably has a radius in the range of 4-6 mm and due to the size of valve entry hole 67A the sidewalls may have a width in the range of 2-3 mm. A length from a bottom end of valve entry hole 67A to the valve's inner opening 64A is also preferably in the range of 4-6 mm. Like the previous embodiments, as air is pumped harder or more forcefully, opening 64A is expanded similarly to allow the passage of a greater volume of air. Once volume 50 is filled with the desired amount of air, needle or head of inflator 70A is removed from the valve entry hole 67A of the valve 60A. Once removed, the pressure P of the air from within the volume 50 again acts upon the sidewalls of the valve member 63A to close the passage from entry hole 67A to the opening 64A with an airtight seal. Preferably, valve 60A is configured such that the opening from valve entry hole 67A through opening 64A into the inner region of the volume 50 is maintained with airtight seal following inflation.

Figure 11A:
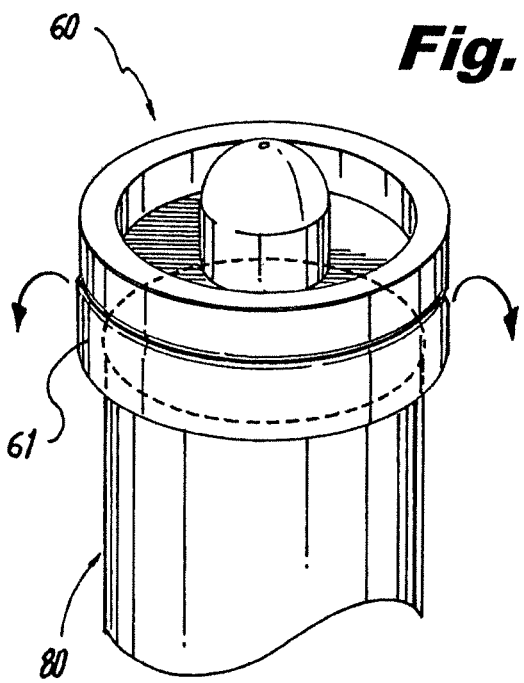
FIG. 11A shows a first step in the method of securing the valve assembly to the inflatable bladder or body using a thermal sealing technique in accordance with an embodiment of the present invention, in particular showing the flange region of the valve member being wrapped around an end of a cylindrical heating rod.
Figure 11B:
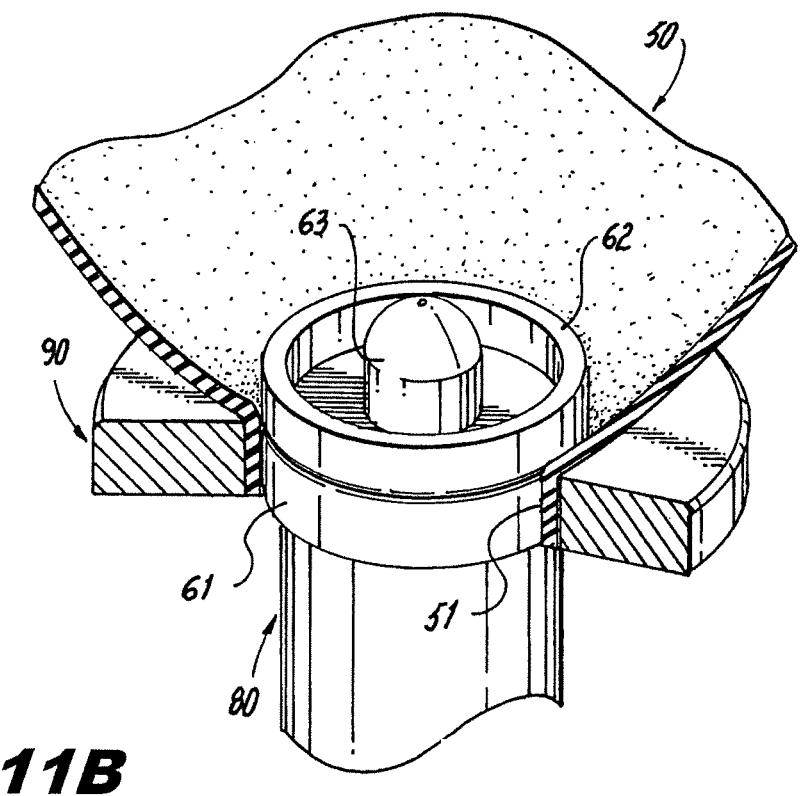
FIG. 11B shows a second step in the method of securing the valve assembly to the inflatable bladder or body using a thermal sealing technique in accordance with an embodiment of the present invention, in particular showing the valve member being inserted into a bounded opening in the inflatable body which is then secured with a sealing collar to firmly hold the bounded wall of the inflatable body against the flange region of the valve member during the thermal sealing.

Referring last to FIGS. 11A-11B, shown are steps in the method of securing the valve assembly 60 to the inflatable bladder 50 using a thermal sealing technique in accordance with a preferred embodiment of the present invention. In particular, as seen in FIG. 11A, the flange region 61 of the valve member 63 is wrapped around an end of a cylindrical heating rod 80. Optionally, heating rod 80 may have a diameter substantially similar to the diameter of the ring member 62 to aid in supporting the valve 60 during the thermal sealing process. With flange 61 wrapped onto the end of heating rod 80, the combined valve 60 and heating rod 80 are inserted into the bounded opening 51 of the inflatable body 50 as seen in FIG. 11B. The valve member 60 is then secured with a sealing collar 90 to firmly hold the bounded wall of the opening 51 of the inflatable body 50 against the flange region 61 of the valve member 60 between the collar 90 and the heating rod 80. During the thermal sealing flange region 61 is thermally sealed with the region of the bounded wall of opening 50. Because the valve member 60 is preferably made from the same material as the inflatable body 50, the thermal seal created therebetween yields a significantly great strength than if the materials were not the same. It will be understood, that the proposed method discuss herein, of securing a valve assembly with an inflatable bladder, may be used similarly with the alternative embodiments in FIGS. 1-5 without departing from the scope and spirit of the present invention.

While a variety of plastic materials may be used with the present invention, as discussed herein, it has been found that preferred materials for use as the valve 60 and the inflatable body 50 to yield the greatest expandability while maintaining the integrity of the seal between the valve 60 and the bounded opening 51 of the inflatable body 50 include plastics such as Mediprene™ 500000M (manufactured by the Elasto Division of Hexpol), Dryflex™ 500040 (available through Ricky Engineering Plastics Co., Ltd, Dongguan City, China), and Versaflex™ CL2003X (manufactured by PolyOne Americas of Avon Lake, Ohio). Testing has shown that, being perfectly elastic (meaning greatest elasticity, retains elasticity, durable elasticity in all directions, remains elastic after thermal bonding), Mediprene™ is the material providing the greatest elasticity while maintaining the thermal seal. While the Dryflex™ and Versaflex™ materials allow for significant elasticity and expansion, each is not perfectly elastic and is more limited than the Mediprene™. It is also noted that in one preferred embodiment the inflatable bladder is constructed from each of the above-noted preferred materials, particularly Mediprene™ 500000M It is noted that the further specific material details of these preferred materials are available on the internet, and via material data safety sheets and technical data sheets for each item provided by the manufacturer, and therefore that this material is available to one of skill in the art and is incorporated herein fully by reference.

In accordance with the present invention, a variety of bonding techniques may be employed to secure the air valve assembly 60 to the bounded wall of opening 51 of the bladder or inflatable body 50. Examples of these bonding techniques, each of which will be discussed below, include thermal bonding, adhesive bonding, and the use of a bonding element. The specific bonding technique utilized to secure the valve to the bladder at least partially depends upon factors that include the materials forming each of the valve and the bladder. More particularly, the bonding technique utilized to secure the valve to the bladder may be selected based upon the materials forming the flange and an outer surface of the bladder.

Referring back to FIGS. 1-5, thermal bonding is one example of how valve 18 being secured to bladder or bounding wall 16. In this configuration, flange 12 lays parallel to and in contact with the inner or outer surface of bladder 16. Thermal bonding may be utilized when one or both of flange 12 and the inner/outer surface of bladder 16 incorporate the same thermoplastic polymer (TPR) materials. Although a strength of the bond between valve 18 and bladder 16 may be sufficiently strong when only one of flange 12 and the inner/outer surface of bladder 16 includes a thermoplastic polymer material, the bond may exhibit greater strength when both flange 12 and the inner/outer surface of bladder 16 are formed from compatible (i.e., readily thermal bondable) thermoplastic polymer materials.

As utilized herein, the term "thermal bonding" or variants thereof is defined as a securing technique between two elements that involves a softening or melting of a thermoplastic polymer material within at least one of the elements such that the materials of the elements are secured to each other when cooled. As examples, thermal bonding may involve (i) the melting or softening of two elements incorporating thermoplastic polymer materials such that the thermoplastic polymer materials intermingle with each other in an integrated and monolithic manner (e.g., diffuse across a boundary layer between the thermoplastic polymer materials) and are secured together when cooled; (ii) the melting or softening of a first element incorporating a thermoplastic polymer material such that the thermoplastic polymer material extends into or infiltrates the structure of a second element to secure the elements together when cooled; and (iii) the melting or softening of a first element incorporating a thermoplastic polymer material such that the thermoplastic polymer material extends into or infiltrates crevices or cavities formed in a second element to secure the elements together when cooled and becomes unitary therewith. Therefore, thermal bonding may occur when (i) both of flange 12 and the inner/outer surface of bladder or bounding wall 16 include thermoplastic polymer materials; or (ii) only one of flange 12 and the inner/outer surface of bladder or bounding wall 16 includes a thermoplastic polymer material. Although thermal bonding may be performed utilizing conduction as the manner in which heat is applied to the elements, thermal bonding also includes the use of radio frequency energy (i.e., radio-frequency bonding) and high frequency sound (i.e., sonic bonding), for example. Additionally, thermal bonding does not generally involve the use of adhesives, but involves directly bonding elements to each other with heat. In some situations, however, adhesives may be utilized to supplement the thermal bond joining flange 12 and bladder or bounding wall 16.

Adhesive bonding is another example of how the valve member 18 may be secured to the bladder 16. In this configuration, the flange 12 lays parallel to the inner/outer surface of bladder or bounding wall 16 and is joined to the inner/outer surface of bladder or bounding wall 16 with an adhesive therebetween (not shown). Although flange 12 may be in contact with the inner/outer surface of bladder 16 when joined through adhesive bonding, a thin layer of adhesive may also separate flange 12 from the inner/outer surface of bladder 16. In general, adhesive bonding may be utilized regardless of the materials forming flange 12 and the inner/outer surface of bladder 16. The chemical composition of the adhesive, however, should be selected in accordance with the particular materials forming flange 12 and the inner/outer surface of bladder 16. In other words, the adhesive should be selected to be capable of bonding with both flange 12 and the inner/outer surface of bladder 16.

Still another example of how the valve may be secured to the bladder is with a bonding element having the form of a tie layer. In this configuration, flange 21 again lays parallel to the inner/outer surface of bladder or bounding wall 16 and is separated from the inner/outer surface of bladder 16 by a tie layer (not shown). In other words, a tie layer is positioned between flange 12 and bladder 16. Although the structure of the tie layer may vary significantly, the tie layer preferably has a circular and/or ring-shaped configuration. Moreover, a diameter of the tie layer is preferably greater than a diameter of flange 12. In this configuration, an outer edge of the tie layer extends outward and beyond an outer edge of flange 12. In addition, the tie layer may be utilized, for example, when flange 12 is formed from vulcanized rubber and the inner/outer surface of bladder 16 is formed from another polymer material. The tie layer may be joined to flange 12 through adhesive bonding and to bladder 16 through thermal bonding. As such, the tie layer may be joined to each of valve 18 and bladder 16 through different bonding techniques. An advantage of using a tie layer is that it may be utilized to bond dissimilar materials in flange 12 and the inner/outer surface of bladder 16. For example, flange 12 and the inner/outer surface of bladder 16 may be formed from materials that do not readily bond through either of thermal bonding and adhesive bonding. The material of the tie layer may, however, be selected such that (i) adhesive bonding joins the tie layer to flange 12; and (ii) thermal bonding joins the tie layer to bladder 16. Thus, the material of the tie layer may be selected to effectively join valve 18 and bladder 16.

Various factors may be considered when selecting materials for bladder or bounding wall 16. As an example, the engineering properties of the materials (e.g., tensile strength, stretch properties, fatigue characteristics, dynamic modulus, and loss tangent) may be considered. The ability of the materials to be shaped into bladder elements and bonded to form seams during the manufacture of bladder or bounding wall 16 may be considered. The ability of the materials to bond with valve 18 through any of the bonding techniques discussed above may also be considered. Additionally, the ability of the materials to prevent the transmission (e.g., diffusion, permeation) of the fluid contained by bladder or bounding wall 16 may be considered.

Suitable materials for bladder or bounding wall 16 include a variety of thermoset and thermoplastic polymer materials. An advantage of thermoplastic polymer materials is that they may be molded (e.g., thermoformed) to impart the shape of each bladder element. Moreover, thermoplastic polymer materials may be thermal bonded to each other to form seams. Examples of polymer materials that may be utilized for bladder or bounding wall 16 include any of the following: polyurethane, urethane, polyester, polyester polyurethane, polyether, polyether polyurethane, latex, polycaprolactone, polyoxypropylene, polycarbonate macroglycol, and mixtures thereof. Any one of the materials noted above may form bladder or bounding wall 16.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method of manufacturing an inflatable body said method comprising steps of:
   providing an air valve assembly for said inflatable body;
      said air valve assembly further comprising:
         a generally flexible body member having an inner and an outer surface, and a generally cylindraceous projection extending from said inner surface of said body member;
         wherein said outer surface is substantially smooth,
         wherein said projection is generally positioned proximate a central region of the central region of said body member, and has a self-sealing opening extending longitudinally for the passage of air from said outer surface to said inner surface during an inflation use,
         wherein a generally radially region of said body member distal said cylindraceous projection is thermally bonded to a surface of said inflatable body proximate an opening in said inflatable body;
         wherein at least one of said body member, said inflatable body, and both said body member and said inflatable body is made from a material selected from a group consisting of thermoplastic elastomer (TPE), thermoplastic rubber (TPR), polyester-based polyurethane, polyether-based polyurethane, polyvinyls, polyesters, polyethers, rubber, latex, nylon, vinyl, polychloroprene, synthetic fabric, synthetic rubber, natural rubber;
   securing an outer flange region of said valve assembly to an outer circumference of a cylindrical heating rod;
   inserting said heating rod with said valve assembly into a bounding wall of said inflatable body, said valve assembly and said bounding wall being substantially formed from said thermoplastic rubber material;
   securing said valve member assembly to said bounding wall with a sealing collar, said sealing collar being generally cylindrical so as to fit around said outer circumference of said heating rod; and
   sealing using said heating rod to heat said valve member assembly and said bounding wall so as to seal a surface of said bounding wall to a surface of said valve member assembly.

2. The method according to claim 1 wherein:
said outer flange region is secured to an exterior circumference of a first end of said cylindrical heating rod.

3. The method according to claim 1, wherein:
said outer flange region is secured to an exterior circumference of a first end of said cylindrical heating rod using said sealing collar.

4. The method according to claim 3, wherein:
said heating rod has a diameter substantially the same as a diameter of a ring member protruding from an inner surface of said valve assembly.

* * * * *